Feb. 9, 1937.  C. RUNYAN  2,069,928
DIRIGIBLE TRAILER
Filed March 16, 1936    4 Sheets-Sheet 1

Inventor
Charles Runyan
By Clarence A. O'Brien and
Hyman Berman Attorneys

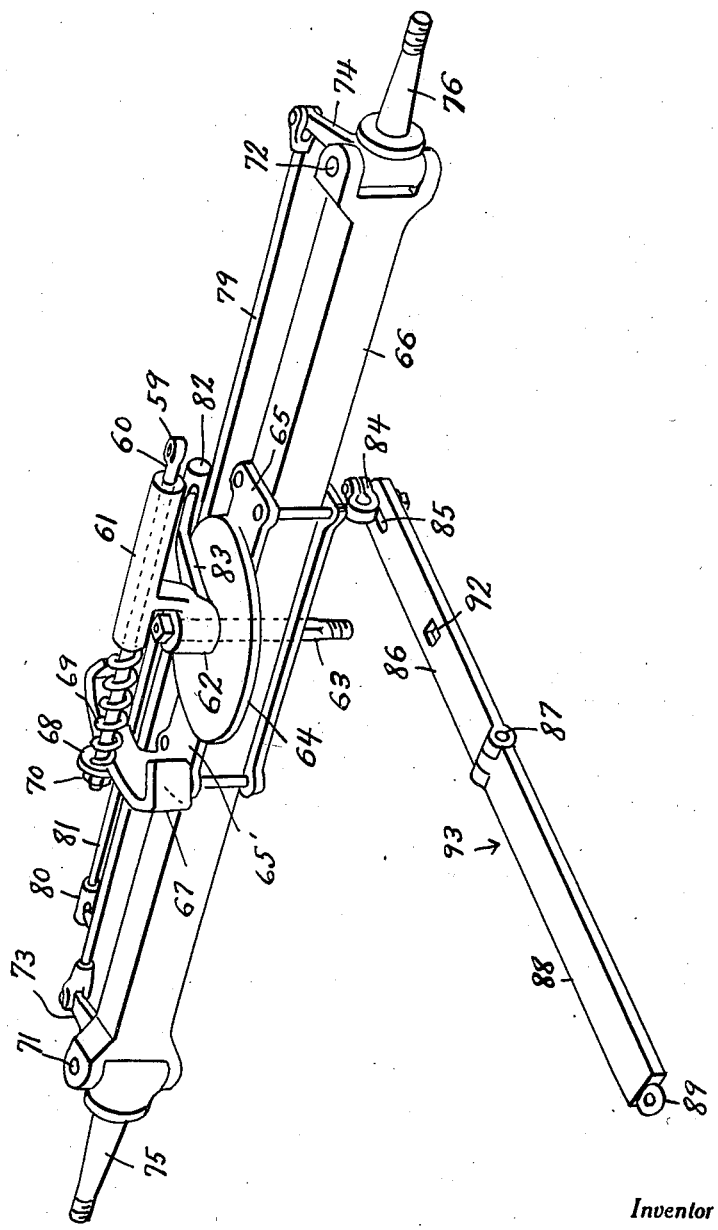

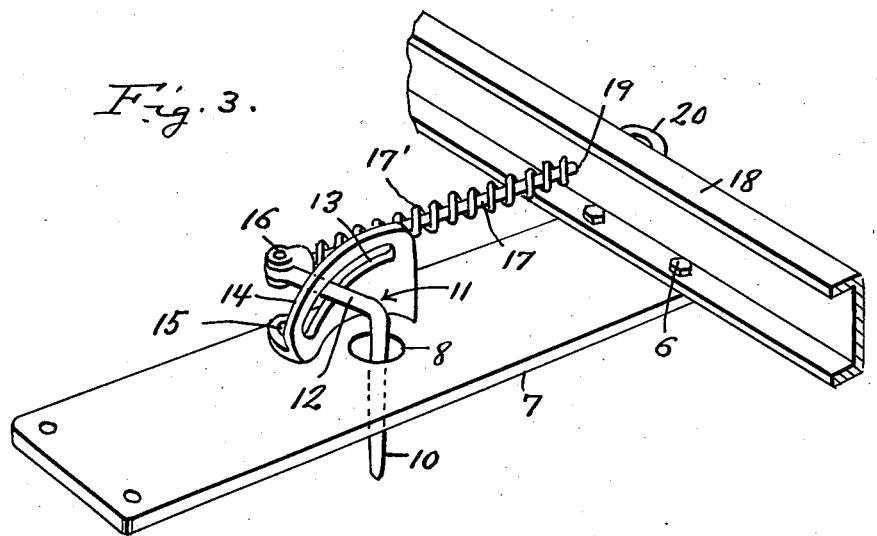
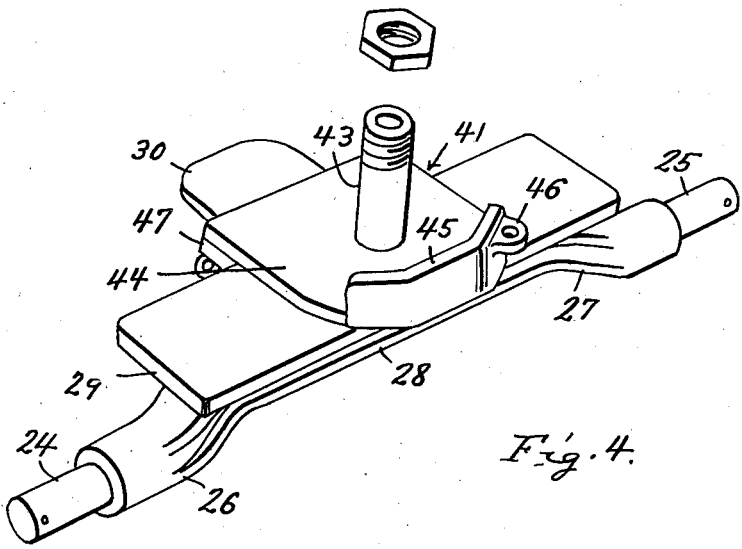
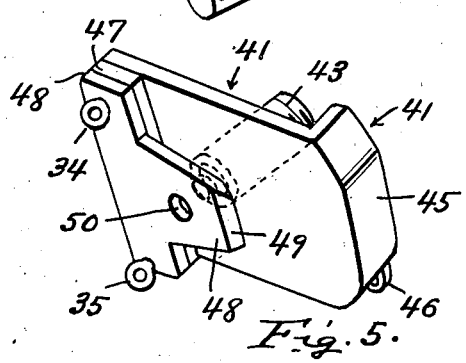

Feb. 9, 1937.　　　C. RUNYAN　　　2,069,928
DIRIGIBLE TRAILER
Filed March 16, 1936　　　4 Sheets-Sheet 4

Inventor
Charles Runyan

By Clarence A. O'Brien and
Hyman Berman
Attorneys

Patented Feb. 9, 1937

2,069,928

UNITED STATES PATENT OFFICE 2,069,928

DIRIGIBLE TRAILER

Charles Runyan, Great Meadows, N. J.

Application March 16, 1936, Serial No. 69,229

5 Claims. (Cl. 280—33.55)

My invention relates generally to automobile trailers and particularly to trailers of the two-wheeled type adapted to have the front portion thereof supported over the rear axle of the draft automobile, and an important object of the invention is to provide a trailer of this character involving steering mechanism operative to steer the rear wheels of the trailer so that the rear wheels of the trailer "track" the rear wheels of the draft vehicle.

Another important object of my invention is to provide an arrangement of the character indicated above which is simple, mechanically efficient, and of relatively low cost.

Another important object of the invention is to provide arrangements of the character indicated above which are readily manipulated and operated in connecting and disconnecting the trailer from the draft vehicle.

Another important object of my invention is to provide arrangements of the character indicated above which permit the draft vehicle to assume a position at right angles to the longitudinal extension of the trailer without injuring or disrupting the steering mechanism of the trailer.

Other important objects of my invention will be apparent from a reading of the following description of the drawings, wherein for purposes of illustration I have shown a preferred embodiment of my invention.

In the drawings:—

Figure 2 is a perspective view of the rear axle assembly of the trailer having portions of the steering mechanism mounted thereon.

Figure 3 is a perspective view of a portion of the trailer chassis showing the arrangement of the retractible coupling pin.

Figure 4 is a perspective view of that portion of the steering mechanism which is mounted on the rear portion of the draft vehicle.

Figure 5 is a perspective view of the bottom of a member of the assembly shown in Figure 4.

Figure 1:
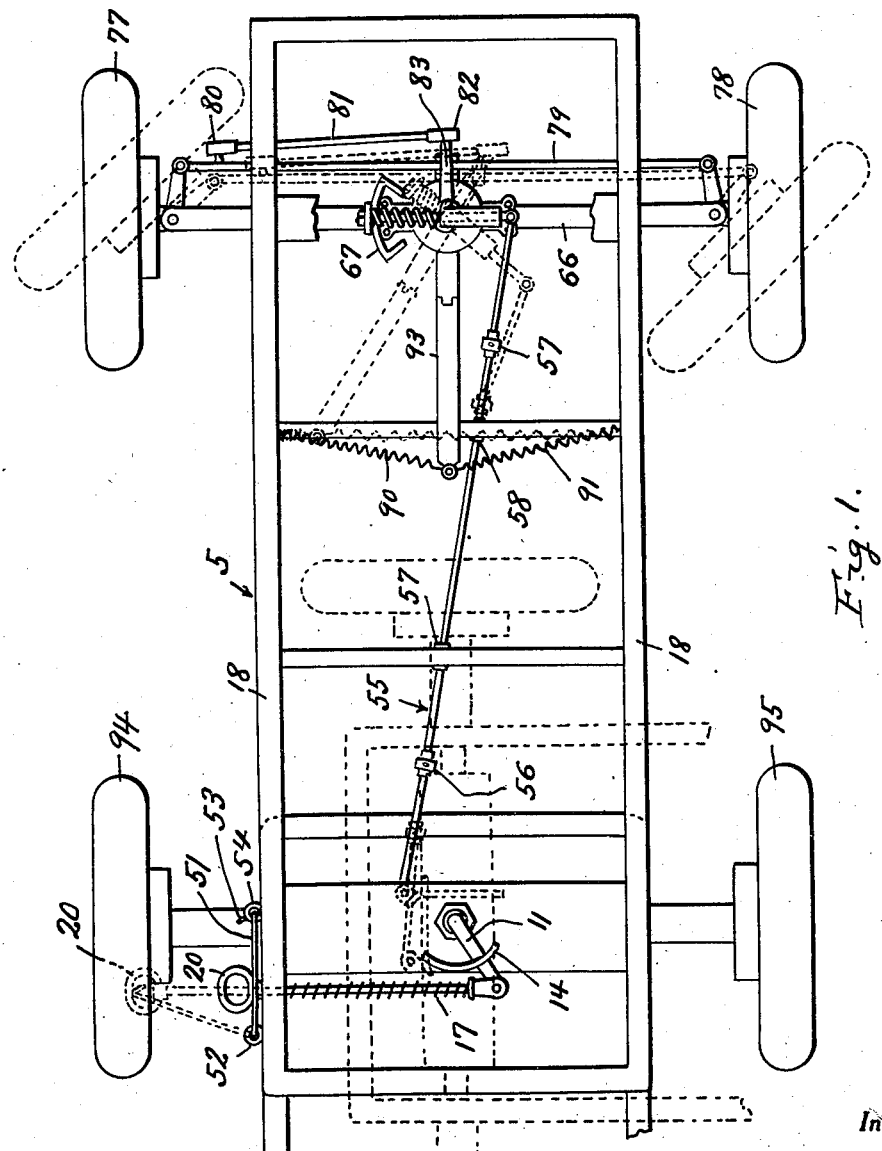
Figure 1 is a general top plan view of the embodiment showing the front end thereof mounted on the rear portion of and over the rear axle of a draft vehicle, the same view showing in dotted lines steered positions of the rear wheels of the trailer, and also a relatively right angular position of the draft vehicle and further showing in dotted lines a withdrawn position of the coupling pin.

Referring in detail to the drawings, the numeral 5 generally designates the chassis frame of the trailer which has bolted as indicated by the numerals 6 to the flange of the side members thereof at a forward part of the chassis the flat cross member 7 which has at its center a hole 8 through which operates the vertical portion 10 of the coupling pin 11 which has a generally horizontal portion 12 slidably mounted in an arcuate cam slot 13 in a cam bracket 14 which is fastened as indicated at 15 to the upper side of the member 7; the front end of the horizontal portion 12 of the king pin 11 being pivoted as indicated by the numeral 16 to the inner end of a releasing arm 17 which slides through the chassis side member 18 as indicated by the numeral 19 and has outside of the chassis side member 18 the eye handle 20. It is obvious that by withdrawing the rod 17 in a laterally outward direction as indicated in dotted lines in Figure 1, the vertical portion 10 of the king pin 11 may be withdrawn in an upward direction so as to enable uncoupling the trailer from the draft vehicle.

Figure 6:
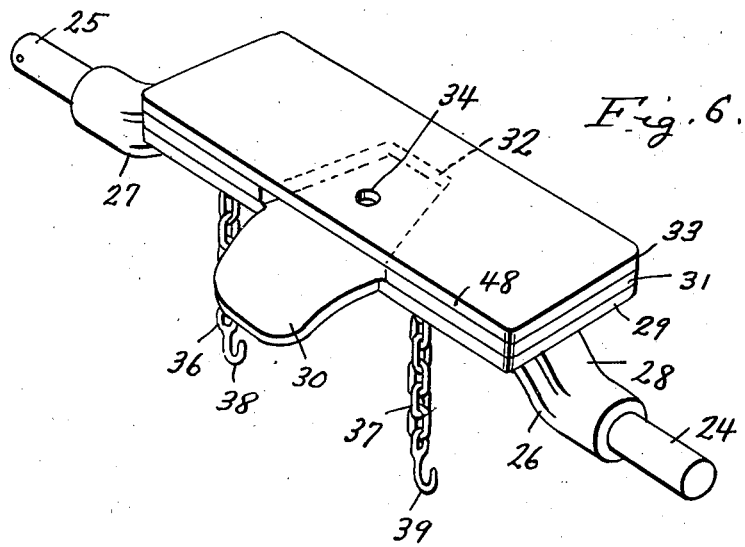
Figure 6 is a perspective view of the draft vehicle mounted member shown in Figure 4, and with the member shown in Figure 5 removed therefrom.

The draft vehicle which is generally designated 21 has the rear frame portion 22 with transversely aligned journal brackets 23 thereon adjacent the rear drive axle 24 and these journal brackets 23 receive the pintles 24, 25 which project from downwardly deflected portions 26 and 27 on a dummy axle 28 which has fastened to the top thereof the transversely elongated plate 29 which has centrally thereon the forwardly projecting downturned tongue 30 and superposed on the plate 29 the plate 31 which has therein a V-shaped opening 32 shown in dotted lines in Figure 6, and superposed on the plate 31 the plate 33, all of the plates being penetrated by a bore 34 which receives the vertical portion 10 of the king pin 11. Transversely spaced eyes 35 passing through the front under edge of the plate 29 have chains 36 and 37 fastened to depend therefrom so that the hooks 38 and 39 on the ends of these chains may be engaged with eyes 40 on the front side of the dummy axle 28. The trailer mounted member is generally designated 41. These chains act to prevent disconnection of the member 41 from the dummy axle assembly just described.

Figure 7:
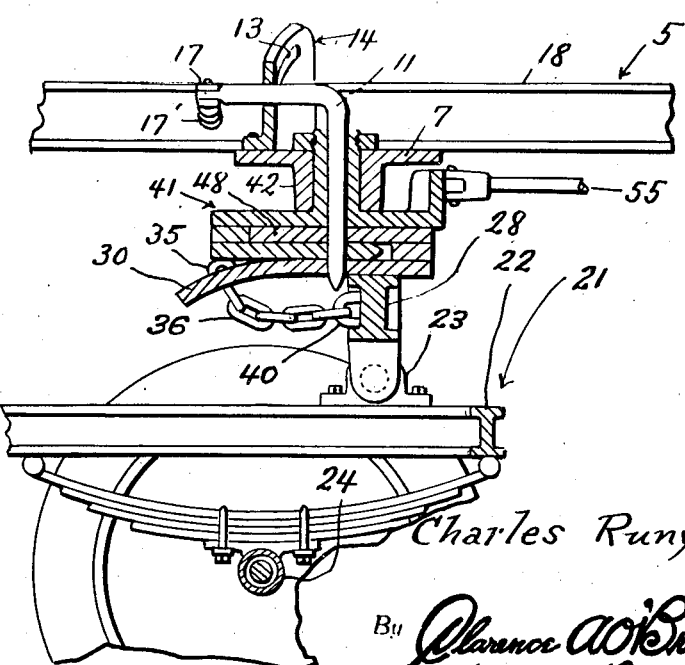
Figure 7 is a longitudinal vertical sectional view taken through the front portion of the trailer and through the draft vehicle mounted member and the member shown in Figure 5 and through the assembly shown in Figure 3, and showing the mounting of the said draft vehicle mounted member on the chassis of the draft vehicle.

The plate 7 which extends between the side members 18 of the trailer chassis frame has depending around the opening 8 the sleeve 42 which is arranged to rotatably receive the tubular riser 43 of the member 41, the said riser extending vertically from a transversely fore-shortened plate 44 which has on its rear edge a curved upstanding flange 45 provided at one side of the rear thereof with a pivot eye 46, said plate 44 being provided at its front edge with a depending cleat 47 which is disposed to engage the front edge 48 of the top plate 33 of the assembly as shown in Figure 6. The cleat 47 has fastened to its underside the tongue 48' which is shaped conformably with the recess 32 in the assembly shown in Figure 6 and has its extremity beveled as indicated by the numeral 49 for sliding up along the top of the tongue 30 and into place in the V-shaped recess 32. The tongue has a bore 50 adapted to be registered with the opening 34 in the assembly shown in Figure 6 for receiving the vertical portion of the king pin or coupling pin 11. Obviously the connection between these assemblies, as described, causes the assemblies to be locked for rotation with each other. The engagement of these assemblies is achieved by bringing the front end portion of the trailer up over the rear portion of the draft vehicle so that the tongue 48' is in front of and longitudinally aligned with the tongue 30 and then either moving the draft vehicle rearwardly or moving the trailer forwardly so as to cause the tongue 48' to slide up along the tongue 30 and into place in the recess 32. The coupling pin 11 is then placed through the bore 34 and through the holes in the riser 43 and in the tongue 48' in the position shown in Figure 7, by releasing the handle 20 so that the spring 17' which is circumposed on the rod 17 and works against the inner side of the side member of the chassis and the clevis of the rod 17 may draw the rod inwardly to the position illustrated in Figure 3. A swingable link 51 has one end hinged in an eye 52 on the outer side of the chassis member 18 and has its opposite hooked end 53 adapted to be supported while not in use in an eye 54 on the chassis member 18, the said end being formed to engage the handle 20 to hold the rod in the outwardly extended position illustrated in dotted lines in Figure 1, in which position the coupling pin is held in a withdrawn position.

Pivoted to the pivot lug 46 of the assembly 21 is the front end of a connecting rod 55 in which universal joints 56 and 57 are incorporated, the said rod working through suitable bearings 57' and 58 mounted on cross members of the chassis. The front end of the rod 55 is connected to the lug 46 on the assembly 41, and the rear end of the rod 55 is pivotally connected to the eye 59 on the end of a transversely slidable rod 60 on the rear axle assembly of the trailer, the rod 60 being slidable in a horizontal tube 61 which is mounted on a bracket 62 which is fastened on a square vertical shaft 63 which traverses the supporting plate 64 which is fastened by ears 65 and 65' on the top of a solid axle 66, the vertical shaft 63 being rotatable in an opening in the said solid axle. The ear 65' has thereon the arcuate guide 67 with which the radially inward side of a washer 68 rotatably mounted on the laterally outward end of the rod 60 rides during such time as the draft vehicle is turned relative to the trailer at an angle less than a right angle, as will be subsequently explained. A spring 69 is circumposed on the rod 60 between the adjacent end of the tube 61 and the washer 68, and the washer is maintained on the rod by a nut 70 positioned as shown. The washer or wheel 68 is arranged to come off either end of the guide 67 and become engaged with the corresponding one of the end plates 67' on the guide whenever the draft vehicle be turned relative to the trailer at an approximate right angle to the trailer, so that the rod 60 may be pulled against the resistance of the spring 69 by the operating rod 55 into the dotted line position illustrated in Figure 1. The wheel or washer 68 remains engaged with the end plate 67' while the draft vehicle is at a right angulated position as shown in dotted lines in Figure 1. If this provision were not made, something would have to break or extension means would have to be provided in the rod 55, to take care of the necessary displacement of the fifth wheel structure 41 consequent upon the draft vehicle assuming a right angular position relative to the trailer since the wheels 77 and 78 will not turn as far as a right angular position. The bottom of the bracket 62 rests rotatably on the turntable or plate 64 as shown in Figure 2. In coming out of the right angular position and resuming a normal position the draft vehicle will turn the assembly 41 correspondingly and cause the shaft 55 to work the rod 60, assisted by the spring 69, to a position in which the wheel or washer 68 reengages with the arcuate part of the guide 67.

Opposite ends of the solid rear axle 66 have mounted therein king pins 71 and 72 mounting steering arms 73 and 74 and wheel pintles 75 and 76 on which the wheels 77 and 78 of the trailer are mounted. A tie rod 79 is pivoted between the steering arms 73 and 74 and to the tie rod 79 is pivotally connected as indicated by the numeral 80 the one end of the drag link 81, and the opposite end of the drag link is pivotally connected as indicated by the numeral 82 to an arm 83 which extends rearwardly from and is threadedly connected to the bracket 62.

For preventing unwanted movement and shimmy of the steering mechanism, a clamp connection 84 is provided with the connecting rod 79 and this clamp connection is mounted pivotally and slidably as indicated by the numeral 85 on the rear end of a flat bar section 86 which is hinged on a horizontal axis as indicated at 87 to the rear end of the flat bar section 88 which has on its front end an eye 89 which has stretched therebetween and between opposite side members 18 of the trailer chassis frame the tensioning springs 90 and 91. The flat bar section 86 has a square opening 92 therein which receives the square shaft 63, so that the lever which is generally designated 93 and which is composed by the sections 86 and 88 swings with the rod 60 and the rigid arm 83 when the rod 60 is swung by operation of the connecting rod 75 as the draft vehicle swings relative to the trailer.

The arrangements and proportioning of the steering mechanism is such that after the trailer has been coupled to the draft vehicle, the rear wheels 77 and 78 of the trailer will be turned to a sufficient degree only to track the rear wheels 94 and 95 of the draft vehicle, so that the driver of the draft vehicle need not take those extraordinary precautions now necessary in driving a trailer equipped vehicle around a turn or in otherwise maneuvering the trailer. It is believed obvious that some supporting means, such as is now commonly used with two-wheeled trailers will be utilized to hold up the front end of the trailer chassis during the coupling and uncoupling operations described herein.

Although I have shown and described herein a preferred embodiment of my invention it is to be definitely understood that I do not desire to limit the application of the invention thereto, and any change or changes may be made in the materials, and in the structure and arrangement of the parts, within the spirit of the invention and the scope of the subjoined claims.

What is claimed as new is:—

1. In combination, a trailer having rear wheels only and having a first horizontal support member fastened at its front, a second horizontal member adapted for mounting on a tractor vehicle and being adapted to be engaged with said first horizontal support to afford mutual support and to permit rotation relative to each other on a vertical axis when said tractor vehicle is turned relative to the trailer, a rigidly mounted axle on the rear of said trailer, steering knuckles on the ends of said rigid axle and mounting said rear wheels, steering arms on said knuckles, a tie-rod extending between said steering arms, a drag link having one end connected to said tie-rod, a rotatable member having a radially outwardly extending arm connected to the remaining end of said drag link, said rotatable member having a radially outwardly extensible arm, and an operating rod extending between and having its opposite ends respectively connected to an eccentric part of said first horizontal member and the outer end of said extensible arm.

2. In combination, a trailer having rear wheels only and having a horizontal support member fastened at its front, a second horizontal member releasably coupled to said first horizontal member, said second horizontal member being adapted for mounting on a tractor vehicle, said second horizontal member being swingable on a vertical axle relative to said first horizontal member when said tractor vehicle is turned relative to the trailer, a rigidly mounted axle on the rear of said trailer, steering knuckles on the ends of said rigid axle and mounting said rear wheels, steering arms on said knuckles, a tie-rod extending between said steering arms, a drag link having one end connected to said tie-rod, a rotatable member supported on said rear axle and having a first radially outwardly extending arm having its outer end connected to the remaining end of said drag link, said rotatable member having a second radially outwardly extensible arm, an operating rod extending between and connected at its respective opposite ends to an eccentric part of said first horizontal member and said extensible arm, and spring means normally resisting radially outward extension of said extensible arm.

3. In combination, a trailer having rear wheels only and having a horizontal support member fastened at its front, a second horizontal support adapted for mounting on a tractor vehicle, means coupling said first and second horizontal supports together and permitting relative swinging thereof on a vertical axis when said tractor vehicle is turned relative to the trailer, a rigidly mounted axle on the rear of said trailer, steering knuckles on the ends of said rigid axle and mounting said rear wheels, steering arms on said knuckles, a tie-rod extending between said steering arms, a drag link having one end connected to said tie-rod, a rotatable member supported on said rear axle and having a radially outwardly extending arm having its outer end connected to the remaining end of said drag link, said rotatable member having a radially outward displaced element, and an operating rod extending between and connected at its opposite ends respectively to an eccentric part of said first horizontal member and the outer end of said extensible arm, said means including a vertically movable coupling pin carried by said first support member and arranged to traverse said second support member for pivotally coupling said first and second support members together in said self-supporting relation.

4. In combination, a trailer having rear wheels only and having a first horizontal support member fastened at its front, a second support member adapted for mounting on a tractor vehicle, means coupling said first and second members for relative rotation on a vertical axis when said tractor vehicle is turned relative to the trailer, a rigidly mounted axle on the rear of said trailer, steering knuckles on the ends of said rigid axle and mounting said rear wheels, steering arms on said knuckles, a tie-rod extending between said steering arms, a drag link having one end connected to said tie-rod, a rotatable member supported on said rear axle and having a radially outwardly extending arm having its outer end connected to the remaining end of said drag link, said rotatable member having a radially outwardly extensible arm, and an operating rod extending between and connected at its opposite ends respectively to an eccentric part of said first horizontal member and said extensible arm, said means including tongue and recess means on said first and second support members, said tongue and recess means being arranged to permit separation of said support members only by relative movement longitudinal of said trailer and said draft vehicle.

5. In combination, a trailer having rear wheels only and having a first support fastened at its front, a second support adapted for mounting on a tractor vehicle, means coupling said first and second supports together for relative rotation on a vertical axis when said tractor vehicle is turned relative to the trailer, a rigidly mounted axle on the rear of said trailer, steering knuckles on the ends of said rigid axle and mounting said rear wheels, steering arms on said knuckles, a tie-rod extending between said steering arms, a drag link having one end connected to said tie-rod, a rotatable member supported on said rear axle and having a radially outwardly extending arm having its outward end connected to the remaining end of said drag link, said rotatable member having a second radially outwardly extensible arm, an operating rod extending between and having its opposite ends respectively connected to an eccentric part of said first support and to the outer end of said extensible arm, said extensible arm comprising a slide rod, a tube in which said slide rod is slidable, a spring retracting said rod in a radially inward direction, and a guide with which a portion of said rod engages while the tractor vehicle is turned relative to the trailer at an angle less than 90°, said guide being arranged to free said rod whenever the draft vehicle is turned beyond 90° relative to the trailer, to enable extension of said slide rod by said operating rod as said second support rotates into the right angular position beyond the limit of turning of said rotatable member.

CHARLES RUNYAN.